United States Patent
Washington

(10) Patent No.: US 10,512,322 B2
(45) Date of Patent: Dec. 24, 2019

(54) PORTABLE HOLDER FOR AN ELECTRONIC DEVICE

(71) Applicant: Robert Washington, Saint Peters, MO (US)

(72) Inventor: Robert Washington, Saint Peters, MO (US)

( * ) Notice: Subject to any disclaimer, the term of this patent is extended or adjusted under 35 U.S.C. 154(b) by 0 days.

(21) Appl. No.: 15/955,656

(22) Filed: Apr. 17, 2018

(65) Prior Publication Data
US 2018/0295975 A1 Oct. 18, 2018

Related U.S. Application Data

(60) Provisional application No. 62/486,804, filed on Apr. 18, 2017.

(51) Int. Cl.
| | | |
|---|---|---|
| *A45F 5/02* | (2006.01) | |
| *F16M 13/02* | (2006.01) | |
| *F16M 11/40* | (2006.01) | |
| *F16M 11/04* | (2006.01) | |
| *F16M 11/14* | (2006.01) | |

(52) U.S. Cl.
CPC ............ *A45F 5/021* (2013.01); *F16M 11/041* (2013.01); *F16M 11/14* (2013.01); *F16M 11/40* (2013.01); *F16M 13/022* (2013.01); *A45F 2200/0516* (2013.01); *F16M 2200/022* (2013.01)

(58) Field of Classification Search
CPC .... F41C 33/04; A45F 5/00; A45F 3/04; A45F 3/08; G03B 29/00; A61F 5/00
See application file for complete search history.

(56) References Cited

U.S. PATENT DOCUMENTS

| | | |
|---|---|---|
| 2,597,670 A | 5/1952 | Pinto |
| 2,702,836 A | 2/1955 | Duncan |
| 2,961,498 A | 11/1960 | Snow |
| 3,757,363 A | 9/1973 | Langlais |
| 3,878,589 A | 4/1975 | Schaefer |
| 3,894,667 A | 7/1975 | Baldocchi |

(Continued)

FOREIGN PATENT DOCUMENTS

| | | |
|---|---|---|
| CN | 204937327 U | 1/2016 |
| DE | 19520502 A1 | 12/1996 |

(Continued)

OTHER PUBLICATIONS

Tech Neck, at https://www.amazon.com/Prank-Pack-Tech-Neck-Standard/dp/B0757WQX9S, Dec. 20, 2017.

(Continued)

*Primary Examiner* — Brian D Nash
(74) *Attorney, Agent, or Firm* — Husch Blackwell LLP

(57) ABSTRACT

A holder apparatus comprises a strap assembly, a cradle assembly, and an arm assembly. The strap assembly includes a support plate component attachable to a belt component. The cradle assembly includes a device-securing structure and an adjustment mechanism. The arm assembly includes a flexible arm component and a clip component. A first end of the flexible arm component is selectively engageable with the clip component. A second end of the flexible arm component is selectively engageable with the cradle assembly.

1 Claim, 7 Drawing Sheets

(56) References Cited

U.S. PATENT DOCUMENTS

| | | | |
|---|---|---|---|
| 4,158,490 A * | 6/1979 | Gottschalk | F16M 11/048 |
| | | | 224/908 |
| 4,320,883 A | 3/1982 | Bass | |
| 4,630,185 A | 12/1986 | Copeland | |
| 4,842,174 A | 6/1989 | Sheppard et al. | |
| 4,846,434 A | 7/1989 | Krogsrud | |
| 4,849,863 A | 7/1989 | Gallegos | |
| 4,854,538 A | 8/1989 | Von Schalscha | |
| 5,014,892 A | 5/1991 | Copeland | |
| 5,033,528 A | 7/1991 | Volcani | |
| 5,054,170 A * | 10/1991 | Otrusina | A45F 5/02 |
| | | | 224/197 |
| 5,083,732 A | 1/1992 | Akamine | |
| 5,086,958 A * | 2/1992 | Nagy | B60N 3/002 |
| | | | 224/277 |
| 5,135,189 A * | 8/1992 | Ghazizadeh | F16M 11/40 |
| | | | 248/104 |
| 5,187,744 A * | 2/1993 | Richter | B60R 11/0241 |
| | | | 224/553 |
| 5,192,041 A | 3/1993 | Bryant | |
| 5,322,253 A * | 6/1994 | Stevens | F16M 13/022 |
| | | | 248/125.1 |
| 5,462,214 A | 10/1995 | Buswell | |
| 5,568,549 A * | 10/1996 | Wang | B60R 11/0241 |
| | | | 379/426 |
| 5,593,121 A * | 1/1997 | Tackett | F41B 5/06 |
| | | | 124/25.5 |
| 5,597,102 A * | 1/1997 | Saarikko | H04B 1/3822 |
| | | | 224/191 |
| 5,699,988 A | 12/1997 | Boettger et al. | |
| 5,762,306 A | 6/1998 | Day | |
| 5,765,793 A * | 6/1998 | Yu | F21S 6/003 |
| | | | 248/126 |
| 5,779,205 A * | 7/1998 | Ching | B60R 11/0241 |
| | | | 248/205.8 |
| 5,823,486 A * | 10/1998 | Smith | A61J 9/0692 |
| | | | 248/104 |
| 5,881,983 A | 3/1999 | Hofmann et al. | |
| 5,937,537 A | 8/1999 | Miller | |
| 5,937,881 A * | 8/1999 | Villa | A45B 23/00 |
| | | | 135/135 |
| 6,137,675 A | 10/2000 | Perkins | |
| 6,142,486 A | 11/2000 | Cedarberg, III | |
| 6,157,163 A | 12/2000 | Blackwood | |
| 6,206,464 B1 * | 3/2001 | Santa Rosa | A47C 7/68 |
| | | | 248/160 |
| 6,357,710 B1 | 3/2002 | Fielden et al. | |
| 6,434,237 B1 | 8/2002 | Murray | |
| 6,481,688 B1 | 11/2002 | Welling et al. | |
| 6,698,044 B2 | 3/2004 | Greenfield et al. | |
| 6,764,231 B1 * | 7/2004 | Shubert | F16M 13/04 |
| | | | 396/419 |
| 6,799,356 B2 | 10/2004 | Sanchez | |
| 6,966,533 B1 * | 11/2005 | Kalis | B60R 11/0241 |
| | | | 248/279.1 |
| D521,990 S | 5/2006 | Richter | |
| 7,136,280 B2 | 11/2006 | Jobs et al. | |
| 7,292,881 B2 | 11/2007 | Seil et al. | |
| 7,311,664 B2 * | 12/2007 | Goodman | A61B 17/02 |
| | | | 600/228 |
| 7,320,450 B2 | 1/2008 | Carnevali | |
| 7,441,981 B2 * | 10/2008 | Crain | E06C 7/14 |
| | | | 248/124.1 |
| 7,628,563 B2 | 12/2009 | Winkler | |
| 7,669,816 B2 * | 3/2010 | Crain | G01C 15/00 |
| | | | 248/183.3 |
| 7,730,565 B1 * | 6/2010 | Masson | A61G 13/101 |
| | | | 5/503.1 |
| 7,757,913 B2 | 7/2010 | Fichera | |
| 7,861,985 B2 | 1/2011 | Galvin | |
| 8,141,210 B2 * | 3/2012 | Colorado | A45F 5/02 |
| | | | 224/197 |
| 8,418,900 B1 | 4/2013 | Baker | |
| 8,439,238 B1 * | 5/2013 | Harter | B60R 11/02 |
| | | | 224/274 |
| D684,979 S * | 6/2013 | Chun | D14/447 |
| 8,505,790 B2 | 8/2013 | Yu et al. | |
| 8,579,172 B2 | 11/2013 | Monaco et al. | |
| 8,602,662 B1 * | 12/2013 | Mans | F16M 11/041 |
| | | | 248/160 |
| 8,631,980 B2 | 1/2014 | Youssefi-Shams et al. | |
| 8,752,802 B1 * | 6/2014 | Fan | H04M 1/04 |
| | | | 248/309.1 |
| 8,881,961 B1 | 11/2014 | Cibirka | |
| 8,885,337 B2 * | 11/2014 | Schanz | B60R 11/0258 |
| | | | 248/229.11 |
| 8,971,959 B2 | 3/2015 | Hunt et al. | |
| 9,016,658 B2 * | 4/2015 | Barnard | F16M 11/041 |
| | | | 248/688 |
| 9,115,843 B2 * | 8/2015 | Huang | F16M 11/08 |
| D739,410 S * | 9/2015 | Chun | D14/447 |
| 9,119,975 B2 * | 9/2015 | Hu | A62B 25/00 |
| 9,309,687 B2 * | 4/2016 | Carnevali | E04H 12/20 |
| D783,014 S * | 4/2017 | Chun | D14/253 |
| 9,664,214 B1 * | 5/2017 | Gupta | F16B 2/10 |
| 9,809,175 B2 * | 11/2017 | Jonik | B60R 11/0241 |
| 9,945,510 B1 * | 4/2018 | Reitberger | F16M 11/40 |
| 9,958,759 B2 * | 5/2018 | Johnson, Sr. | G03B 17/561 |
| 2004/0211799 A1 | 10/2004 | Loughman | |
| 2005/0040192 A1 | 2/2005 | Steven et al. | |
| 2005/0092877 A1 * | 5/2005 | Carnevali | F16M 11/40 |
| | | | 248/160 |
| 2005/0242144 A1 | 11/2005 | Panosian et al. | |
| 2006/0108485 A1 | 5/2006 | Enderle | |
| 2006/0253109 A1 | 11/2006 | Chu | |
| 2007/0164987 A1 | 7/2007 | Graham | |
| 2010/0078536 A1 | 4/2010 | Galvin | |
| 2011/0007207 A1 | 1/2011 | Corticelli | |
| 2013/0214022 A1 | 8/2013 | Harvey | |
| 2014/0312090 A1 | 10/2014 | Garza, Jr. | |
| 2015/0195392 A1 | 7/2015 | Nissenbaum | |
| 2015/0223590 A1 | 8/2015 | Arias-Tabima | |
| 2015/0305479 A1 | 10/2015 | Sanchez | |
| 2016/0091139 A1 | 3/2016 | Levine et al. | |

FOREIGN PATENT DOCUMENTS

| | | |
|---|---|---|
| JP | 04039497 A | 2/1992 |
| JP | 10078194 A | 3/1998 |
| JP | 2006119554 A | 5/2006 |
| WO | 9221911 A1 | 12/1992 |

OTHER PUBLICATIONS

Smith, U.S. Pat. No. 10,163A, Oct. 25, 1853.

* cited by examiner

PORTABLE HOLDER FOR AN ELECTRONIC DEVICE

RELATED APPLICATIONS

The present application claims the benefit of U.S. Provisional Application Ser. No. 62/486,804 entitled Hands-Free Device for an Electronic Device, filed Apr. 18, 2017, the entire disclosures of which is hereby incorporated by reference.

FIELD

The present disclosure relates generally to the field of portable holders for an electronic device. In a specific example, the present disclosure may relate to a hands-free electronic device cradle assembly.

BACKGROUND

As consumer's lives become busier by the minute, the use of our hands to multitask while enjoying our electronic devices is becoming more important.

Hands-free assemblies for holding electronic devices are common. Electronic devices include devices such as, but not limited to, iPhone®, IPOD®, IPAD®, cellular phone, smart phone, music player, and the like. Many hands-free assemblies attach directly to a person. Other assemblies attach to objects, such as a car dashboard. Particularly with wearable hands-free assemblies, many have multiple straps or harnesses that can be overwhelming and uncomfortable. Other assemblies are not fully adjustable which limits the usability.

What is needed is a convenient, easy to use, and comfortable hands-free means of optimally viewing an electronic device from many angles. At the same time, the hands-free means should have an option for the user to attach the electronic device to other objects, such as a dresser or piece of exercise equipment.

SUMMARY OF THE INVENTION

In a first example embodiment, a holder apparatus comprises a strap assembly, a cradle assembly, and an arm assembly. The strap assembly includes a support plate component attachable to a belt component. The cradle assembly includes a device-securing structure and an adjustment mechanism. The arm assembly includes a flexible arm component and a clip component. A first end of the flexible arm component is selectively engageable with the clip component. A second end of the flexible arm component is selectively engageable with the cradle assembly.

In an example second embodiment, a holder apparatus comprises a cradle assembly, an arm assembly selectively engageable with the cradle assembly, and a strap assembly selectively securable with the arm assembly. The cradle assembly includes at least one bracket for securing a device in the cradle assembly, and a dial component that may be rotated to adjust the position of the at least one bracket. The cradle assembly also includes a socket component integrally molded to the cradle assembly. The arm assembly includes a flexible arm component with a first end and a second end. A ball portion is at the second end of the flexible arm component. The ball portion is receivable by the socket component of the cradle assembly. The arm assembly also includes a clip component integrally molded to the first end of the flexible arm component. The clip component includes a first lever and a second lever connected together. The first lever is secured to the first end of the flexible arm component, and the second lever has at least one flange. The strap assembly includes a support plate component and a belt component. The belt component is attachable to the support plate component. The support plate component includes at least one projection, the at least one flange of the clip component selectively receivable by the projection to secure the arm assembly to the strap assembly.

DETAILED DESCRIPTION

Example embodiments of the portable holder for an electronic device are described. In the following description, for purposes of explanation, numerous specific details are set forth in order to provide a thorough understanding of example embodiments. It will be evident, however, to one of ordinary skill in the art that embodiments of the present disclosure may be practiced without these specific details.

Figure 1:
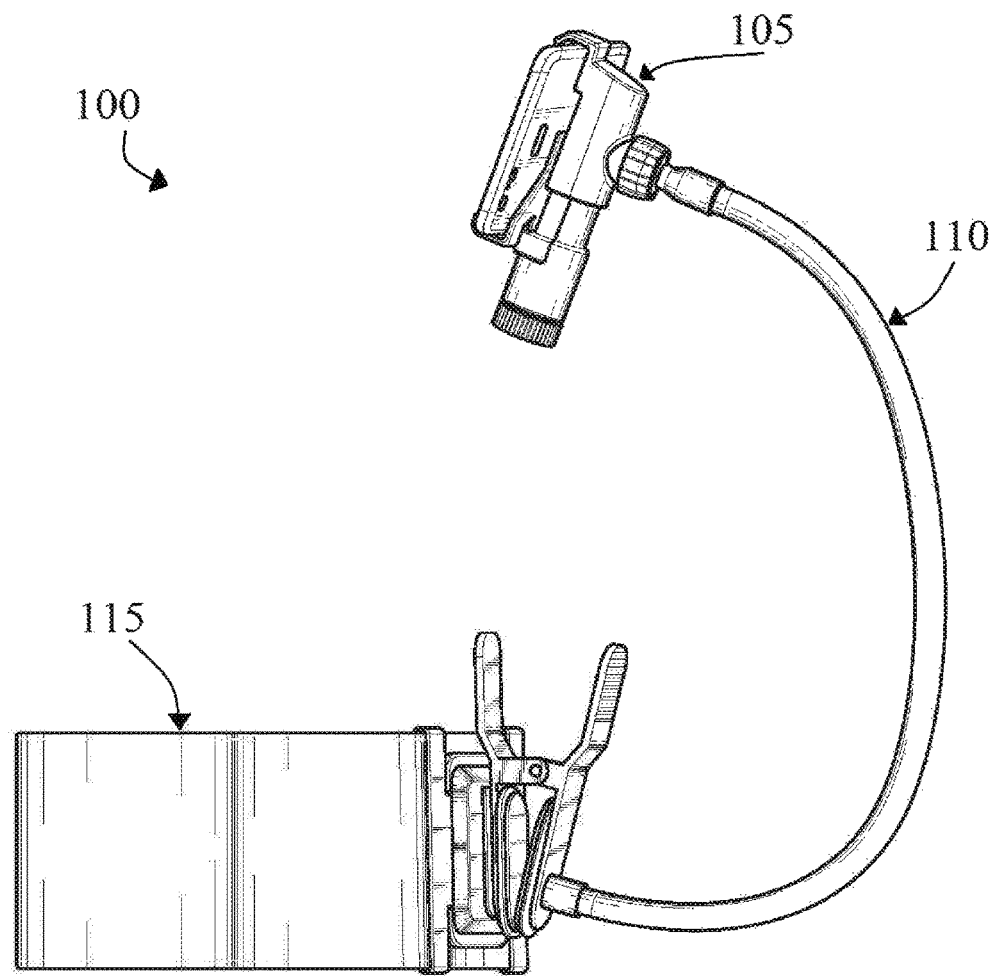
FIG. 1 is a front left elevation view of a portable holder for an electronic device according to an embodiment of the disclosure.

FIG. 1 is a front left elevation view of a portable holder for an electronic device 100. FIG. 1 shows the main apparatuses that make up the portable holder for an electronic device 100, including a cradle assembly 105, an arm assembly 110, and an optional strap assembly 115.

Figure 2:
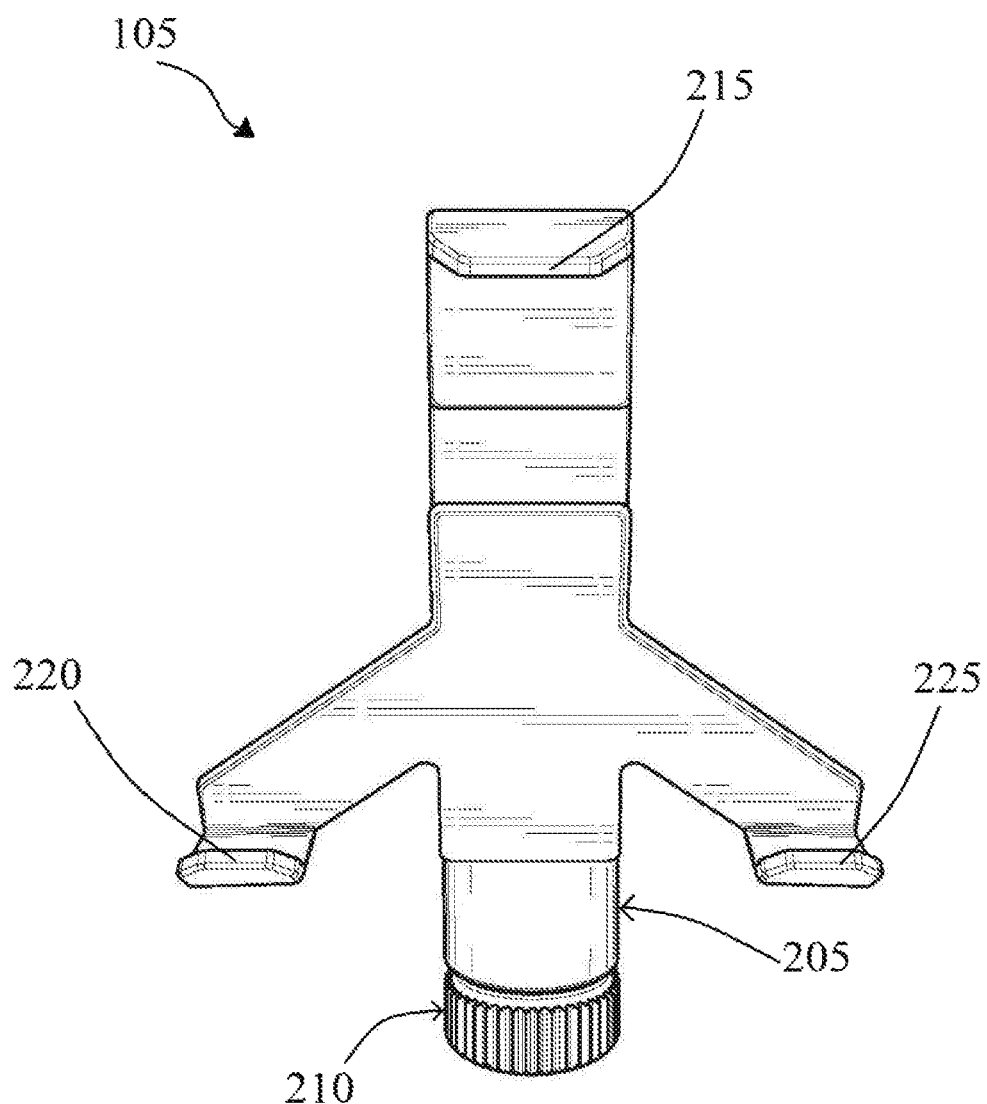
FIG. 2 is a rear elevation view of the cradle assembly of the portable holder for an electronic device according to an embodiment of the disclosure.
Figure 3:
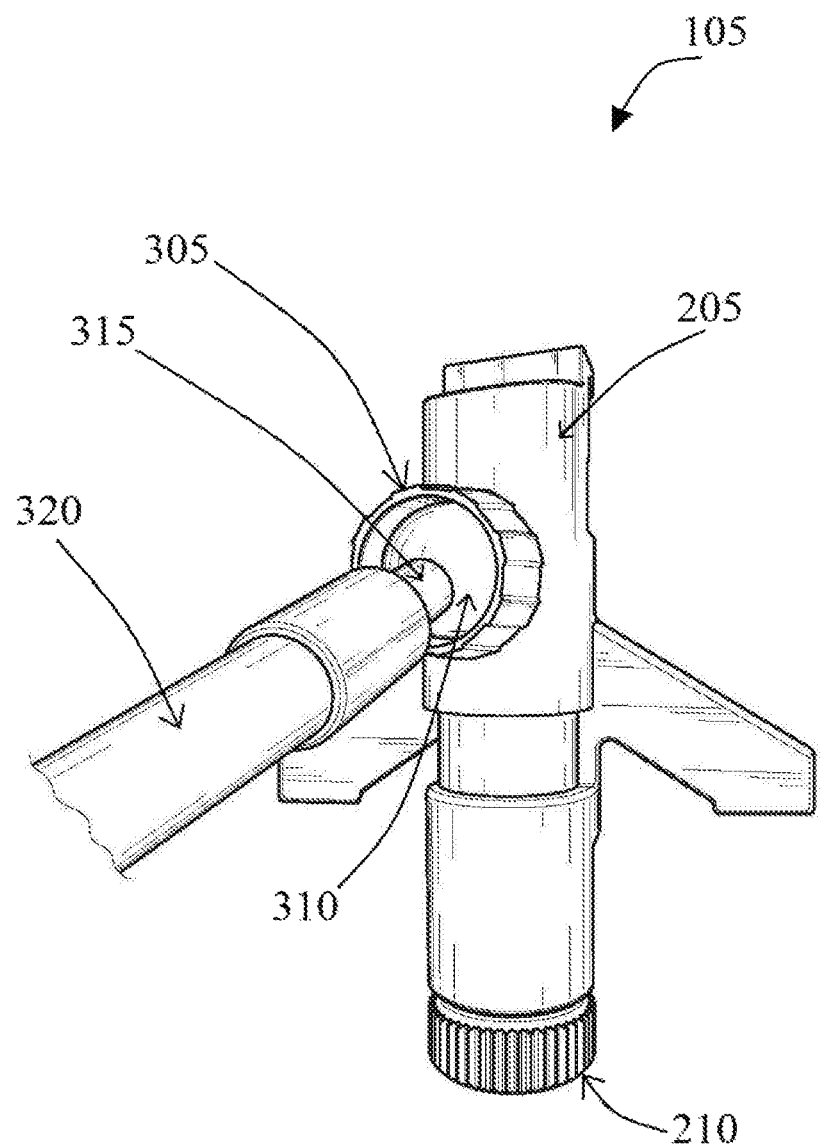
FIG. 3 is a perspective view of the cradle assembly according to an embodiment of the disclosure.

FIGS. 2 and 3 illustrate the cradle assembly 105. The cradle assembly 105 may include a cradle body component 205 and a dial component 210. The dial component 210 may be rotated to adjust the holding capacity of the cradle body component 205, as discussed below. While a dial component 210 is shown, it will be understood that other adjustment mechanisms will be possible.

FIG. 2 is a rear elevation view of the cradle assembly 105. This view shows one embodiment of the plurality of brackets used to secure the electronic device in the cradle assembly 105. As shown, the cradle body component 205 has an upper bracket 215, a first lower bracket 220, and a second lower bracket 225. Rotating the dial component 210 adjusts the size of the cradle body component 205. Rotation of the dial component 210 moves the upper bracket 215 up or down along a longitudinal axis running through the center of the dial component 210 and the center of the upper bracket 215. Rotating the dial component 210 rotates a threaded member (not shown) within the cradle body component 205 that moves the upper bracket 215 relative to the lower brackets 220, 225. In the embodiment shown, the first lower bracket 220 and second lower bracket 225 are fixed relative to the cradle assembly 105. The brackets 215, 220, 225 may be lined with an elastomeric or other soft material to cushion their interface with an electronic device placed in the cradle assembly 105. While a three-bracket structure is shown, it will be understood that other device-securing structures will be possible. It is also envisioned that the cradle body component 205 could come in a variety of colors or themes, such as in the colors of or with a logo for a sports team.

FIG. 3 shows another view of the cradle assembly 105. In the embodiment shown, a socket component 305 may be integrally molded to the cradle assembly 105. The socket component 305 may operate as any known ball-in-socket joint, in combination with a ball portion 310, to form a connection between the cradle assembly 105 and the arm assembly 110.

The ball portion 310 is located at a second end 315 of a flexible arm component 320 of the arm assembly 110. The socket component 305 may receive the ball portion 310. As discussed above, the socket component 305 may thereby be able to rotate freely. The socket component 305 may be screwed down onto the ball portion 310 to selectively secure the ball portion 310 therein. The socket component 305 may be unscrewed to release the ball portion 310 therefrom or for readjustment. By rotating this portion of the socket component 305, the socket component 305 may be loosened or tightened around the ball portion 310. In a loose stage, the ball portion 310 may be entirely removed from the socket component 305. An advantage of the connection shown is that it can secure the cradle assembly 105 to the second end 315 of the flexible arm component 320 at nearly any angle due to the nearly 360 degrees of rotation of the socket component 305 about the ball joint 310. Once the cradle assembly 105 is moved into the desired position with respect to the arm assembly 110, the rotatable portion of the socket component 305 may be tightened to secure the cradle assembly 105 into a steady and stable position that is fixed relative to the second end 315 of the flexible arm component 320. While a ball-and-socket joint is shown, other connection mechanisms are envisioned to connect the cradle assembly 105 to arm assembly 110.

Figure 4:
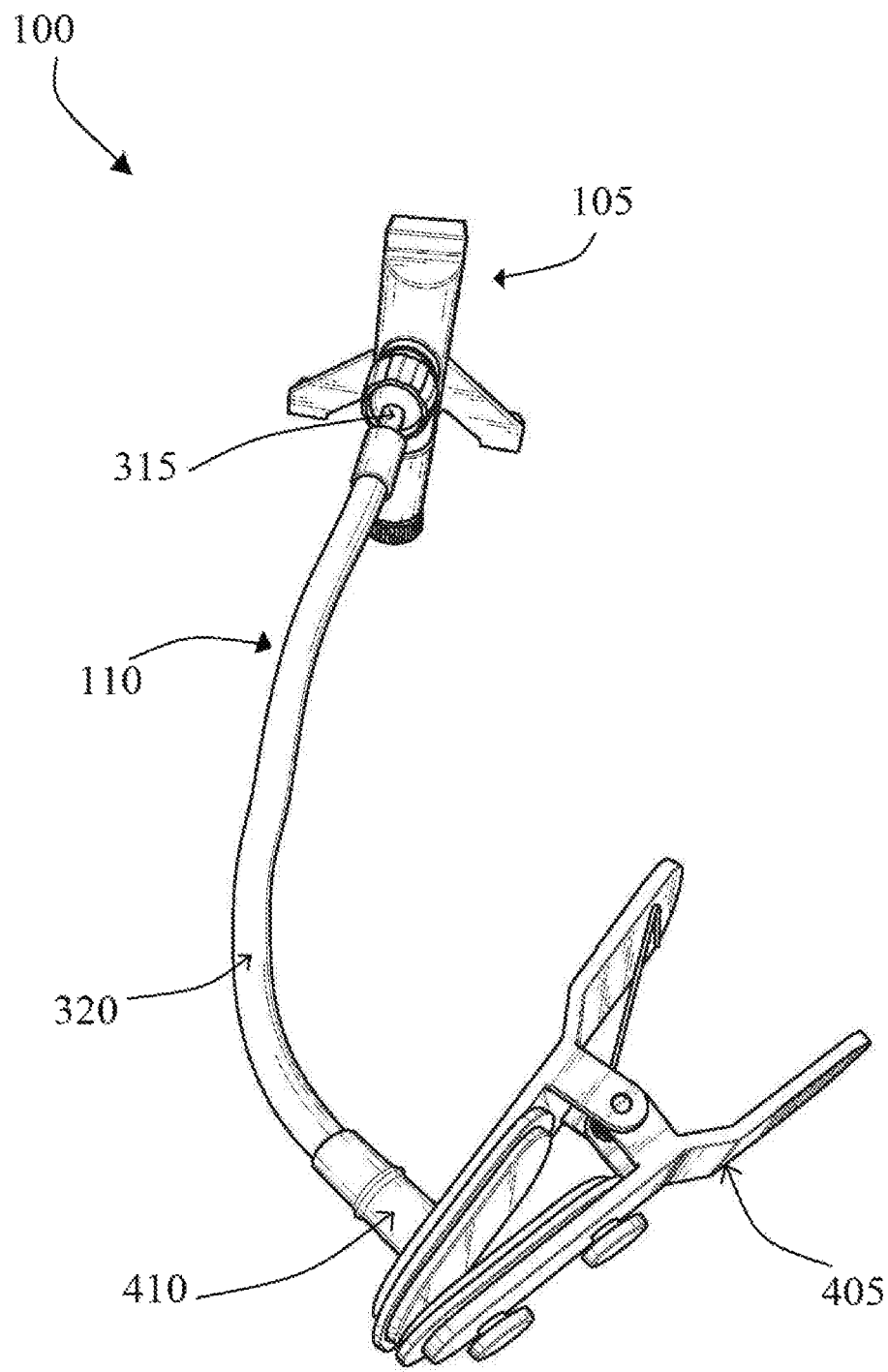
FIG. 4 is another perspective view of the portable holder for an electronic device shown in FIG. 1. In the embodiment shown in FIG. 4, the clip component is not secured to the support plate component as in FIG. 1.

FIG. 4 shows the cradle assembly 105 attached to the arm assembly 110, which includes the flexible arm component 320 and a clip component 405. The flexible arm component 320 has a first end 410 and a second end 315. The first end 410 of the flexible arm component 320 may be integrally molded, or otherwise attachable, to the clip component 405. The second end 315 of the flexible arm component 320 may be integrally molded, or otherwise attachable, to a ball portion 310. In a preferred embodiment, the flexible arm component 320 may be a flexible, adjustable, resilient rod capable of being stably deformed in any direction and at multiple locations along the arm. This flexibility gives a user a nearly unlimited range in adjusting the position of the cradle assembly 105, which can provide the user with an optimal view when an electronic device is placed in the cradle assembly 105. In one embodiment, the flexible arm component 320 may be a gooseneck, where flexibility and distortion of the flexible arm component 320 is accomplished by the user positioning flexible jointed spines.

Figure 5:
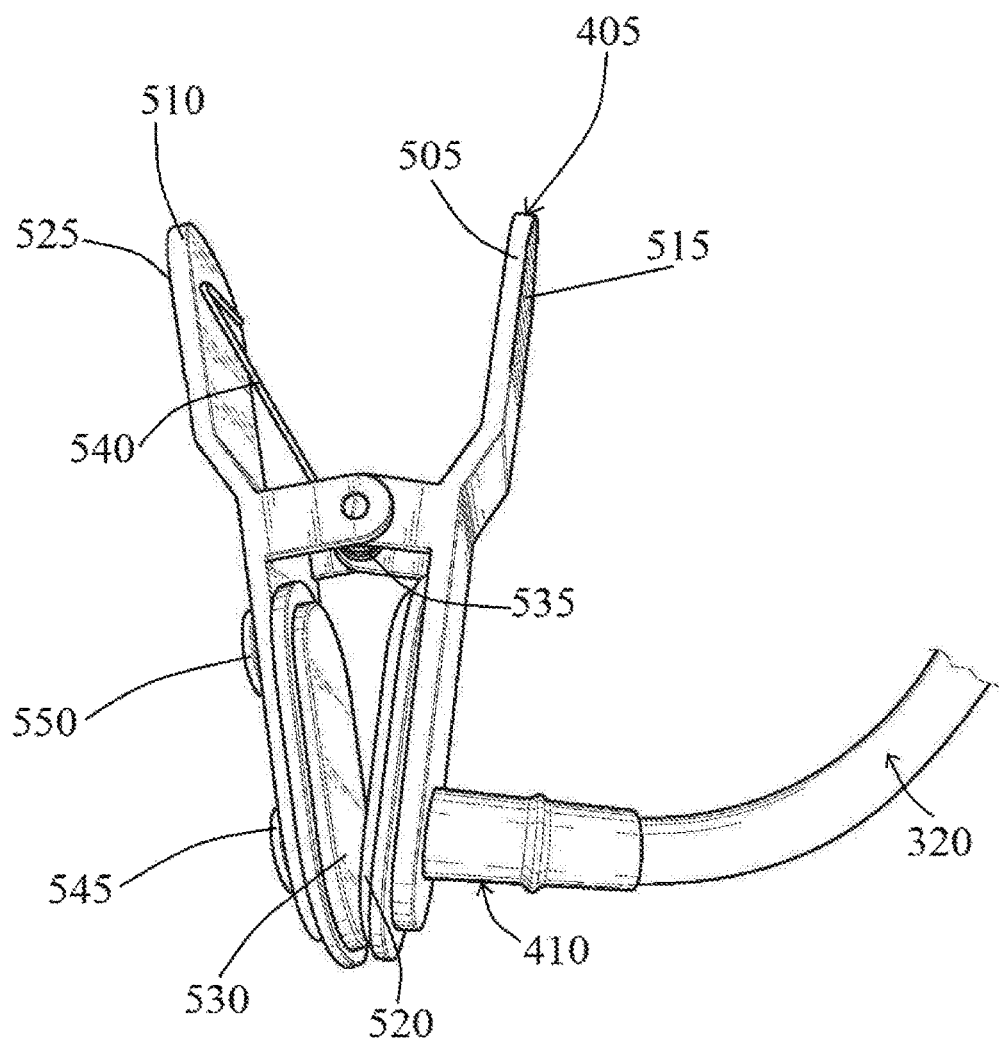
FIG. 5 is left elevation view of the clip component. In this embodiment, the clip component is not secured to the support plate.
Figure 6:
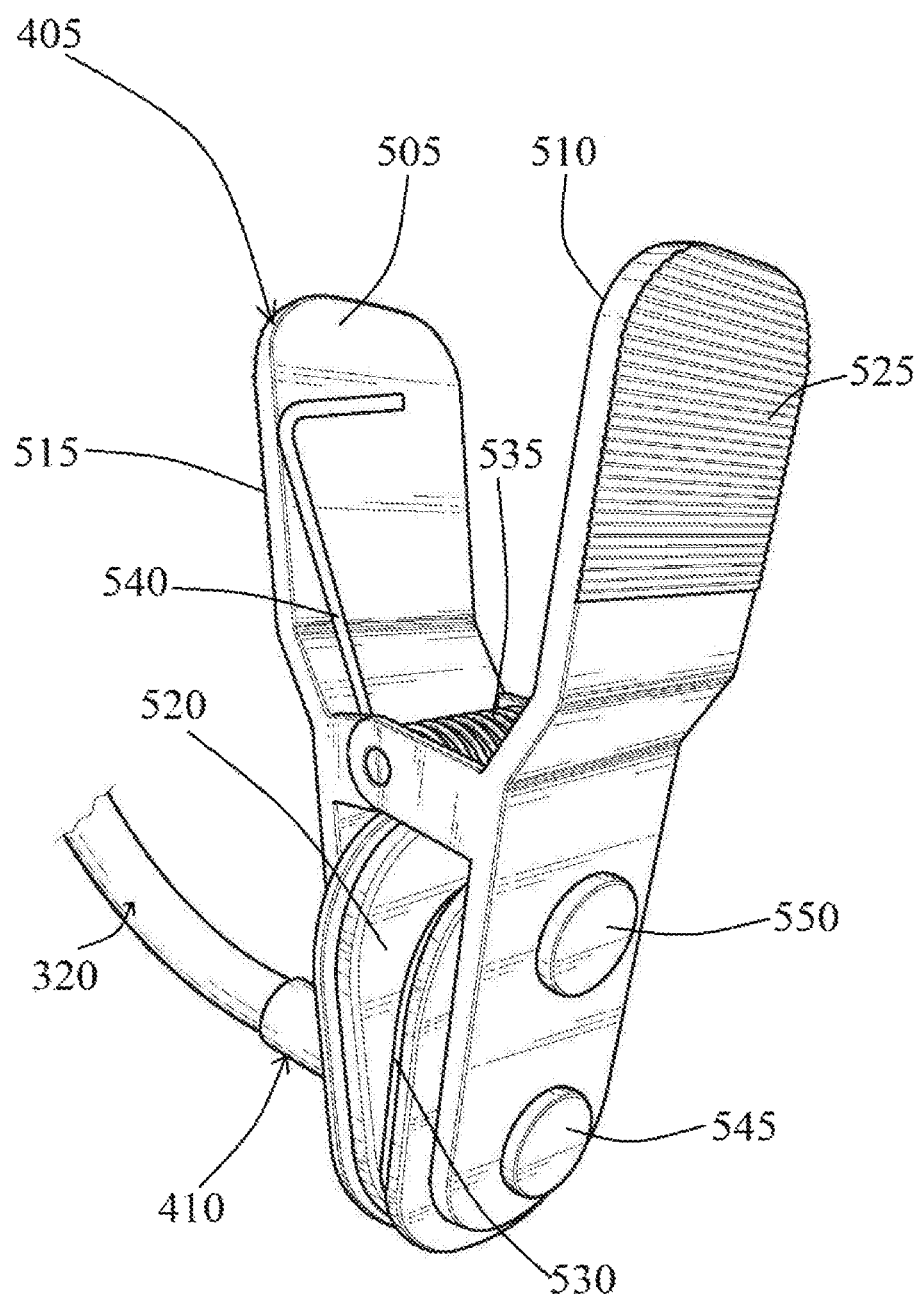
FIG. 6 is a perspective view of the clip component. In this embodiment, the clip component is not secured to the support plate.

The clip component 405 is further illustrated in FIGS. 5 and 6. The clip component 405 includes a first lever 505 and a second lever 510. Among parts of the levers, the first lever 505 has an upper portion called the first clamp portion 515 and a lower portion to which a first pad member 520 may be affixed. The second lever 510 has an upper portion called the second clamp portion 525 and a lower portion to which a second pad member 530 may be affixed. The first clamp portion 515 opposes the second clamp portion 525, and the first pad member 520 opposes the second pad member 530.

The levers 505 and 510 are preferably hinged together by a wire or other hinge. The wire is potentially wrapped by a spring 535 with a spring extension 540 situated against the upper portion of one of the levers, so that moving the first clamp portion 515 toward the second clamp portion 525 simultaneously moves the first pad member 520 away from the second pad member 530. In this embodiment, the motion that increases the distance between the first and second pad members 520 and 530 may occur regardless of whether it is the first clamp portion 515 moved toward the second clamp portion 525, the second clamp portion 525 moved toward the first clamp portion 515, or each clamp portion moved toward the other clamp portion.

In a preferred embodiment, the first pad member 520 and the second pad member 530 may provide a layer of elastomeric or other cushioning material on the inner surfaces of the lower portion of the first and second levers 505, 510. This layer enhances the stability of a connection between the clip component 405 and an object it may be attached to, such as a dresser, while also providing protection for the object's surface.

The first lever 505 of the clip component 405 is preferably engaged with the first end 410 of the flexible arm component 320. For example, the first lever 505 may be integrally formed with the first end 410 of the flexible arm component 320. The second lever 510 may include one or more flanges on its outer surface, that is, on the surface that faces away from the first end 410 of the flexible arm component 405. The one or more flanges may be used to secure the clip component 405 to the strap assembly 105, as discussed further below. As shown in the embodiment in FIGS. 3 and 4, the one or more flanges may be two disc-shaped flanges 545 and 550.

Figure 7:
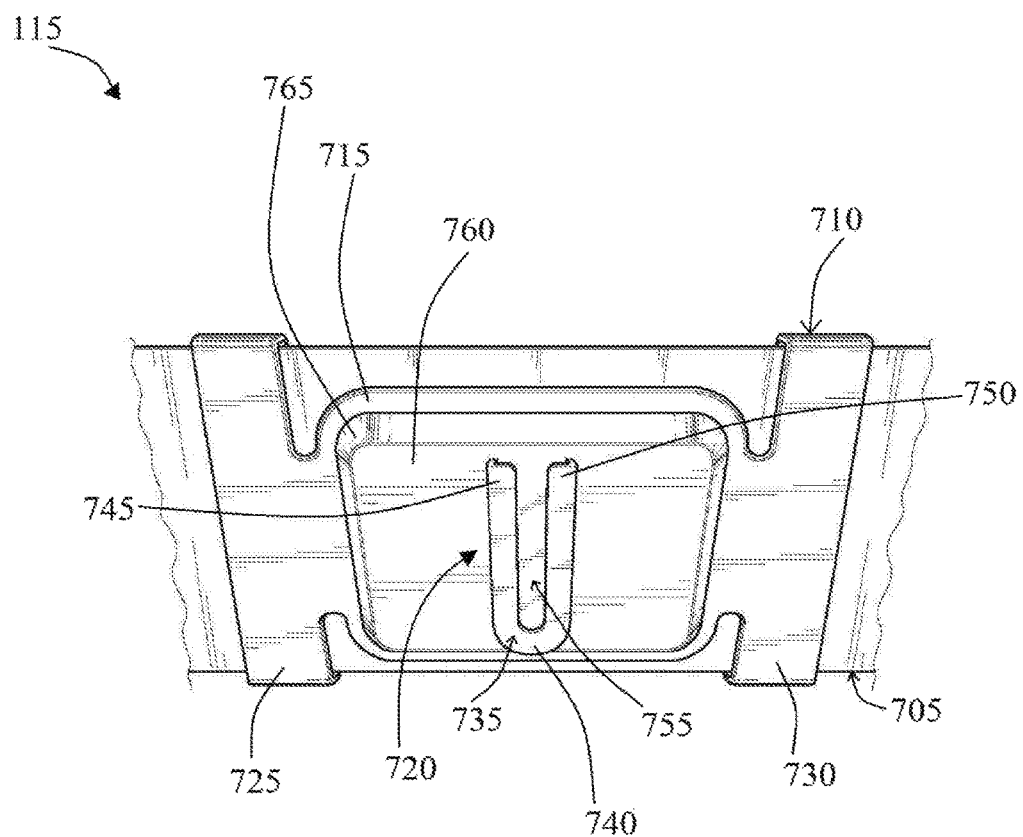
FIG. 7 is a perspective view of a portion of the strap assembly, showing the support plate component in accordance with an embodiment of the present disclosure.

A preferred embodiment of the strap assembly 115 is illustrated in FIGS. 1 and 7. The strap assembly 115 may include a belt component 705 and a support plate component 710. The strap assembly 115 can be attached to the arm assembly 110 by securing the clip component 405 to the support plate component 710. The belt component 705 is preferably made of durable material and secures tightly around a user's waist area. The means for closing the belt around the user's waist is not shown, but such closing means would be understood in the art. For example, the belt component 705 could have two ends that snap, button, buckle, tie, and/or Velcro together to constrict on or near the user's waist. It is also envisioned that the belt component 705 could be made of a material that allows the belt component 705 to be a single closed loop with no ends. In an example embodiment of the belt component 705, the material would stretch so the user could place the belt around the waist by pulling it over the user's lower or upper body and bringing it to the abdominal area.

An example support plate component 710 is illustrated in FIG. 7. The support plate component 710 includes a support plate body portion 715 with a clip attachment component 720. The clip attachment component 720 may be part of the support plate body portion 715. In the embodiment shown in FIG. 7, the clip attachment portion 720 sits above the support plate body portion 715.

The support plate body portion 715 further includes at least one connection portion for the belt component 705 to pass through. This passage attaches the support plate component 710 to the belt component 705. In the embodiment shown in FIG. 7, the support plate component 710 contains a connection portion comprised of two loops 725, 730 for the belt component 705 to pass through. As shown, the first loop area 725 and second loop area 730 are part of the support plate body portion 715. Alternatively, a single loop or other mechanisms could secure the support plate component 710 to the belt component 705. In the embodiment shown, the support plate component 710 is not fixed to a particular segment of the belt component 705, but instead can be moved freely along the belt component 705. It will be evident to one skilled in the art that alternative configurations may be envisioned for the connection portion to attach the support plate body portion 715 to the belt component 705.

The support plate component 710 may be further configured so that the clip component 405 attaches to it. Importantly, the attachment mechanism binding the support plate component 710 and the clip component 405 does not necessarily make use of the relative position of the first and second pad members 520, 530 of the clip component 405. Instead, the clip component 405 may be secured to the support plate component 710 by an entirely separate mechanism. In the embodiment shown, the mechanism by which the clip component 405 attaches to the support plate component 710 is by a standard "T-slot" attachment. While the T-slot attachment is shown as the clip attachment component 720, other shaped slots and connectors are envisioned, including buttons and snaps. For embodiments that include the strap assembly 115, the connection defined by the clip attachment component 720 attaching the support plate component 710 and the clip component 405 is preferably stable. This stability thereby allows the user to engage in physical activity while maintaining a steady, optimal view of a device held by the cradle assembly 105.

As shown, the T-slot provisionally attaches one or more projections on the support plate component 710 to one or more flanges on the clip component 405. In this "T-slot" embodiment, the projections on the support plate component 710 preferably include at least a U-shaped member 735. The U-shaped member may be defined by a bottom end 740, a first top end 745, and a second top end 750. The first top end 745 is spaced apart from the second top end 750 such that, in the view shown in FIG. 7, a non-elevated. T-slot portion 755 that sits beneath the U-shaped member 735 forms a T shape. The U-shaped member 735 and T-slot portion 755 make up the clip attachment component 720. Flanges on the clip component 405, such as the first and second flange members 545, 550 discussed above, slide into the T-slot portion 755. In this embodiment, securing the flanges 545 and 550 behind the U-shaped member 735 firmly and stably attaches the clip component 405 to the support plate component 710. In the embodiment shown in FIG. 7, the clip attachment component 720 sits atop a raised plateau portion 760, which is slightly elevated above the support plate body portion 715 by an elevation portion 765. While a T-slot structure is shown, it will be understood that other securing structures will be possible.

The inventive subject matter may be represented in a variety of different embodiments of which there are many possible permutations.

Although embodiments of the present disclosure have been described with reference to specific example embodiments, it will be evident that various modifications and changes may be made to these embodiments without departing from the broader spirit and scope of the embodiments of the present disclosure. Accordingly, the specification and drawings are to be regarded in an illustrative rather than a restrictive sense.

In the foregoing Detailed Description, it can be seen that various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A holder apparatus comprising:
   a cradle assembly, including:
      at least one bracket for securing a device in the cradle assembly;
      a dial component that may be rotated to adjust the position of the at least one bracket; and,
      a socket component integrally molded to the cradle assembly;
   an arm assembly selectively engageable with the cradle assembly, the arm assembly including:
      a flexible arm component with a first end and a second end;
      a ball portion at the second end of the flexible arm component, the ball portion being receivable by the socket component of the cradle assembly; and,
      a clip component integrally molded to the first end of the flexible arm component, the clip component including:
         a first lever and a second lever connected together, wherein the first lever is secured to the first end of the flexible arm component, and the second lever has at least one flange;
   and,
   a strap assembly selectively securable with the arm assembly, including:
      a support plate component;
      a belt component attached to the support plate component through a belt connection portion of the support plate component;
      at least one projection on the support plate component;
      wherein the at least one projection on the support plate component selectively receives the at least one flange of the clip component to secure the arm assembly to the strap assembly.

* * * * *